UNITED STATES PATENT OFFICE 2,140,274

FIBER

Earle O. Whittier and Stephen P. Gould, Washington, D. C., dedicated to the free use of the People of the United States of America No Drawing. Application August 12, 1937, Serial No. 158,822

2 Claims. (Cl. 28—1)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

We hereby dedicate the invention herein described to the free use of the People of the United States of America to take effect on the granting of a patent to us.

Our invention deals with fibers made from casein.

The objects of our invention are to produce dispersions of casein (mixed usually with plasticizers and salts), which can be extruded into fibers having the requisite characteristics of strength, water resistance, flexibility, and softness necessary to make them suitable for use in textiles, and are valuable as substitutes for wool and other fibers.

Other objects will become apparent in the course of the following teachings.

In forming dispersions suitable for extrusions, the casein is dissolved or dispersed in a solution of some protein solvent. Plasticizers, salts for increasing the strength and water-resistance, and fireproofing ingredients may be incorporated in the dispersion.

Some of the best plasticizers were found to be the fat acids, i. e., those usually obtained by the hydrolysis of oils and fats, or their salts. These give to the fibers a highly desirable flexibility, softness, and water repellency. Used alone with the casein dispersion, some loss in strength of the filaments occurs; but by the addition of sodium aluminate, or other salts, the strength may be considerably increased. The casein and the fat acids are both dispersed in aqueous or alcoholic solutions of sodium hydroxide, ammonium hydroxide, or other suitable solvents, such as borax or sodium phosphate. Sodium aluminate (or similar compounds comprising amphoteric elements united with an alkali metal, such as sodium tungstate or sodium chromate) may then be added. The sodium aluminate, for example, serves as an additional solvent because of its alkalinity, and it also acts as a method of making aluminum compatible with the solution before extrusion as at this stage of the process no insoluble aluminum salts can be formed. When the solution is forced through any type of spinnerette normally used in the rayon industry, and thence into a bath having an acid reaction (and usually also an aldehyde and a dehydrating agent) the aluminum is converted into its positive form in the precipitated fiber. This unites the casein and fat acids into a homogenous fiber, and insoluble aluminum salts of casein and fat acids are formed. The aluminum thus serves as a strengthening and water resisting agent, the fat acid components act to soften and make flexible the fibers, and to increase their water repellency, and resistance to moth attack. These filaments are very much better than when unplasticized casein is used as such fibers are too brittle, and not so water resistant. In addition to the fat acids, other plasticizers or softeners may be used, as for example, amyl lactate, ethylene glycol monobutyl ether, latex (this also increases the waterproofness); maleic acid, and tartaric acid, or their salts.

Calcium chloride, magnesium chloride, or other salts of these metals, can be used (although not in the presence of some plasticizers) as hardening and water-repelling agents in the casein fibers, instead of sodium aluminate. Ammoniacal or amine solutions of casein work best when using calcium and magnesium salts, as complexes are formed which give a more homogenous solution, and calcium caseinate will not separate so readily before the dispersion is extruded.

The following examples are given to illustrate some of the preferred procedures for producing our fibers. Proportions are given in parts.

Example 1

| | |
|---|---|
| Casein | 24 |
| Water | 197.5 |
| Fat acids from linseed oil | 5 |
| Sodium hydroxide solution (2N) | 13 |
| Sodium aluminate | 0.5 |

Temperature of the solution was 70° C. but other temperatures ranging from 50° C. up may be employed. The dispersion was extruded into a precipitating bath heated at the same temperature. The bath composition was: sulfuric acid, 2 pts.; formaldehyde, 5; glucose, 10; water, 83. However, other bath compositions may be used. This procedure gives fibers which are flexible, fairly strong, and water repellent. Oleic acid substituted for the linseed oil acids gives somewhat more flexible fibers. Salts of these fat acids are, of course, formed with the excess of sodium hydroxide.

Precipitating baths of various compositions may be used. One of the most widely used is listed under Example 1. Another consists of 5 pts. acetic acid, 5 of formaldehyde, 20–80 of ethanol, made up to 100 parts with water. In general, the baths contain: a precipitant of an acid reaction, a substance to aid in dehydrating the fibers, and a hardening agent, such as formaldehyde.

Sometimes an aqueous or alcoholic bath containing calcium chloride may be used. The fibers are extruded into this, and are then treated with a dilute sulfuric acid solution, as shown by:

*Example 2*

| | |
|---|---|
| Calcium chloride | 5 |
| Formaldehyde | 5 |
| Water | 90 |

It will be understood that our invention is not restricted to any of the examples given, as proportions, constituents, and substitutes may be varied over a wide range. For example, various protein solvents may be used; and in place of the precipitating acids listed, other acids, such as oxalic may be employed. The proportions of the aldehydes may particularly be altered. Acetone can be used in the bath as a precipitant and dehydrant.

Having thus described our invention, what we claim for Letters Patent is:

We claim:

1. As an article of manufacture, a fiber comprising casein and salts of casein and fat acids.

2. As an article of manufacture, a fiber comprising casein and aluminum salts of casein and fat acids.

EARLE O. WHITTIER.
STEPHEN P. GOULD.